(12) United States Patent
Kuz et al.

(10) Patent No.: US 9,290,401 B2
(45) Date of Patent: Mar. 22, 2016

(54) GLASS GOB WEIGHT CONTROL ASSEMBLY FOR A GLASSWARE MOLDING MACHINE

(71) Applicants: Zdenko Kuz, Steinhausen (CH); Bruno Viada, Madonna Delle Grazie (IT); Maurizio Barolo, Fossano (IT)

(72) Inventors: Zdenko Kuz, Steinhausen (CH); Bruno Viada, Madonna Delle Grazie (IT); Maurizio Barolo, Fossano (IT)

(73) Assignee: Bottero S.p.A., Cuneo (IT)

( * ) Notice: Subject to any disclaimer, the term of this patent is extended or adjusted under 35 U.S.C. 154(b) by 159 days.

(21) Appl. No.: 13/930,338

(22) Filed: Jun. 28, 2013

(65) Prior Publication Data
US 2014/0000317 A1 Jan. 2, 2014

(30) Foreign Application Priority Data

Jun. 29, 2012 (IT) ............................. TO2012A0582

(51) Int. Cl.
| | |
|---|---|
| *C03B 7/00* | (2006.01) |
| *C03B 9/41* | (2006.01) |
| *C03B 7/086* | (2006.01) |
| *C03B 9/193* | (2006.01) |

(52) U.S. Cl.
CPC ................. *C03B 7/086* (2013.01); *C03B 7/005* (2013.01); *C03B 9/1936* (2013.01); *C03B 9/41* (2013.01)

(58) Field of Classification Search
CPC ............ C03B 9/13; C03B 9/41; C03B 9/403; C03B 9/165; C03B 23/0315; C03B 27/0404; C03B 27/056; C03B 37/03; C03B 7/005; C03B 7/086; C03B 9/1932; C03B 9/1936; F27D 2019/0003
See application file for complete search history.

(56) References Cited

U.S. PATENT DOCUMENTS

| | | | |
|---|---|---|---|
| 4,662,923 A | 5/1987 | Vajda | |
| 5,139,559 A | 8/1992 | Kozora | |
| 5,266,093 A * | 11/1993 | Konishi et al. | ................... 65/158 |
| 5,491,372 A * | 2/1996 | Erhart | ............................. 310/80 |
| 5,644,227 A | 7/1997 | Geisel | |
| 5,707,414 A * | 1/1998 | Leidy | ............................... 65/158 |
| 7,332,958 B2 * | 2/2008 | Matsushima | ..................... 330/2 |

(Continued)

FOREIGN PATENT DOCUMENTS

| | | | |
|---|---|---|---|
| DE | 3401465 | 1/1985 | |
| JP | 07332958 A * | 12/1995 | ............. G01B 17/00 |
| JP | H07332958 | 12/1995 | |

OTHER PUBLICATIONS

Yamawaki JP07332958 machine translation provided by http://dossier1.ipdl.inpit.go.jp/AIPN/odse_top_dn.ipdl?N0000=7400on Mar. 11, 2015.*

(Continued)

*Primary Examiner* — Jodi C Franklin
(74) *Attorney, Agent, or Firm* — Ohlandt, Greeley, Ruggiero & Perle L.L.P

(57) ABSTRACT

An assembly for controlling the weight of a glass gob on a glassware molding machine has a punch for at least partly penetrating the gob and controlled by a fluidic linear actuator having an outer sleeve of paramagnetic material, and a piston which slides inside the sleeve; the piston being connected integrally to the punch; and movement of the piston being controlled by a linear transducer having a movable member fitted to the piston, and a fixed member located outside the sleeve.

12 Claims, 5 Drawing Sheets

(56) References Cited

U.S. PATENT DOCUMENTS

| | | | |
|---|---|---|---|
| 2008/0111431 A1* | 5/2008 | Dorel | 310/26 |
| 2009/0226332 A1* | 9/2009 | Tinholt et al. | 417/53 |
| 2011/0262266 A1* | 10/2011 | Rakoci | 415/118 |
| 2013/0299444 A1* | 11/2013 | Villaret De Chauvigny et al. | 215/44 |
| 2014/0000317 A1* | 1/2014 | Kuz et al. | 65/164 |

OTHER PUBLICATIONS

European Office Action dated Oct. 13, 2014 corresponding to European Patent Application No. 13174443.5; 18 pages.

Italian Search Report dated Mar. 18, 2013 corresponding to Italian Application No. ITTO20120582; 8 pages.

* cited by examiner

GLASS GOB WEIGHT CONTROL ASSEMBLY FOR A GLASSWARE MOLDING MACHINE

The present invention relates to a glass gob weight control assembly for a glassware molding machine.

BACKGROUND OF THE INVENTION

In glassware molding, machines, such as I.S. molding machines, are employed, in which a molding assembly comprises an extruder for forming a continuous rope of molten glass; and a cutting device for cutting the molten-glass rope crosswise into a series of glass gobs.

Each glass gob is inserted inside a mold, and is pressed against the inner surfaces of the mold by a pre-forming punch device located beneath the mold and comprising a punch, and a linear piston actuator for moving the punch to and from a forward pressure position, in which the punch is inserted inside the gob.

The weight or mass of the glass gobs is controlled periodically using a gob weight control assembly, which comprises a device for detecting the position of the punch; and a control unit for adjusting the operating conditions of the extruder on the basis of a position signal from the detecting device.

In some known embodiments, the detecting device is associated with the linear piston actuator, and comprises a position transducer for determining the longitudinal position of the moving member of the piston, and therefore of the punch.

The detecting device may be designed in various ways. In some solutions, the detecting device only covers part as opposed to the whole travel of the linear actuator; and, in others, the detecting device extends completely inside the actuator, which complicates the actuator design-wise, and leaves the detecting device exposed to dirt and lubricating oils inside the actuator.

In other solutions, the detecting device itself may be so complex as to require specific, dedicated linear actuators.

The actuators normally operate in high-temperature, highly contaminated conditions, and so call for continual maintenance, which various known solutions make difficult.

SUMMARY OF THE INVENTION

It is an object of the present invention to provide a glass gob weight control assembly for a glassware molding machine, which differs from existing solutions and at the same time is highly efficient and reliable, and permits fast, easy maintenance/replacement of both the linear actuator and the control assembly itself.

According to the present invention, there is provided a glass gob weight control assembly for a glassware molding machine, the assembly comprising a punch for at least partly penetrating a glass gob; a fluidic linear actuator for moving said punch, and in turn comprising an outer sleeve, and a piston which slides inside said sleeve, is connected integrally to said punch, and is movable between two limit positions, of which one is a withdrawn position, and the other a forward position in which said punch is inserted inside said glass gob; and transducer means for determining the position of said piston between said withdrawn and forward positions; the assembly being characterized in that said sleeve is made of paramagnetic material, and in that said transducer means comprise a magnetic movable member fitted to said piston, and a fixed member located outside said sleeve and cooperating with said magnetic movable member.

In the assembly defined above, said fixed member is preferably located adjacent to an outer surface of said sleeve, and is parallel to the travel direction of said piston.

Preferably, said magnetic movable member is housed completely inside said piston and conveniently surrounded by a spacer ring made of different material from the magnetic movable member and interposed between the magnetic movable member and an inner surface of said sleeve.

BRIEF DESCRIPTION OF THE DRAWINGS

A non-limiting embodiment of the present invention will be described by way of example with reference to the attached drawings, in which.

DETAILED DESCRIPTION OF THE INVENTION

Figure 1:
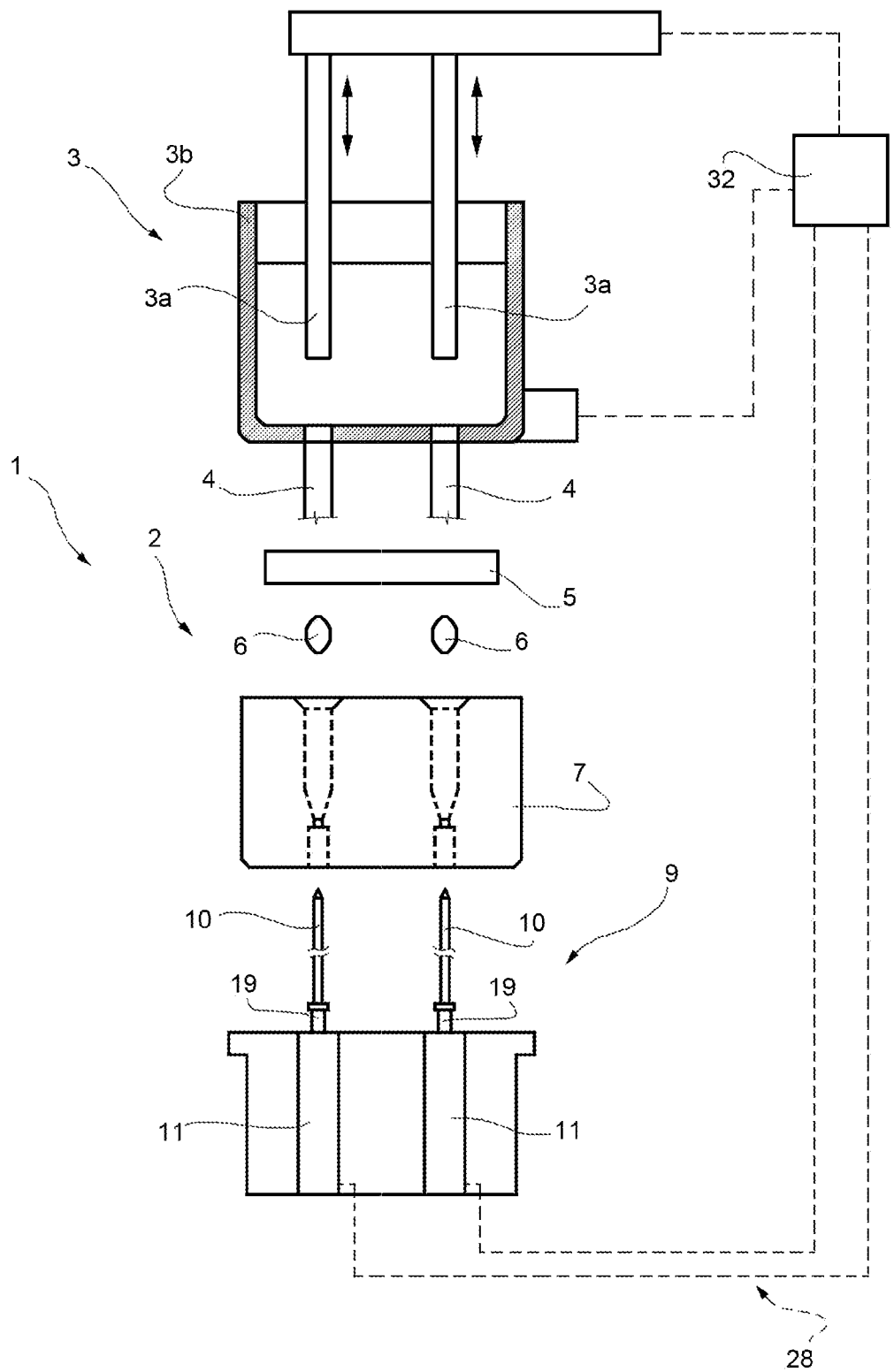
FIG. 1 shows a schematic, substantially block diagram, with parts removed for clarity, of a glassware molding machine comprising a glass gob weight control assembly in accordance with the teachings of the present invention.

Number 1 in FIG. 1 indicates as a whole an I.S. glassware molding machine.

Machine 1 comprises a molding assembly 2, in turn comprising a known extruder 3, which, in the example described, comprises two extruder rods 3a, each for producing a respective continuous rope 4 of molten glass; and a rotating hollow body or tube 3b movable up and down, parallel to and with respect to rods 3a, to open or close the extruded-glass passage and so regulate outflow of the extruded glass. In a variation, the extruder comprises a different number of extruder rods.

Machine 1 also comprises a known cutting device 5 for cutting each rope 4 crosswise into a succession of glass gobs 6.

Machine 1 also comprises a known mold assembly, which, for each extruder rod 3a, comprises a rough mold 7 for receiving gobs 6; and a pre-forming device 9, which is located beneath mold 7 and comprises, for each succession of gobs 6, a punch 10 and a corresponding fluidic linear actuator 11 for moving punch 10 to and from mold 7.

Figure 2:
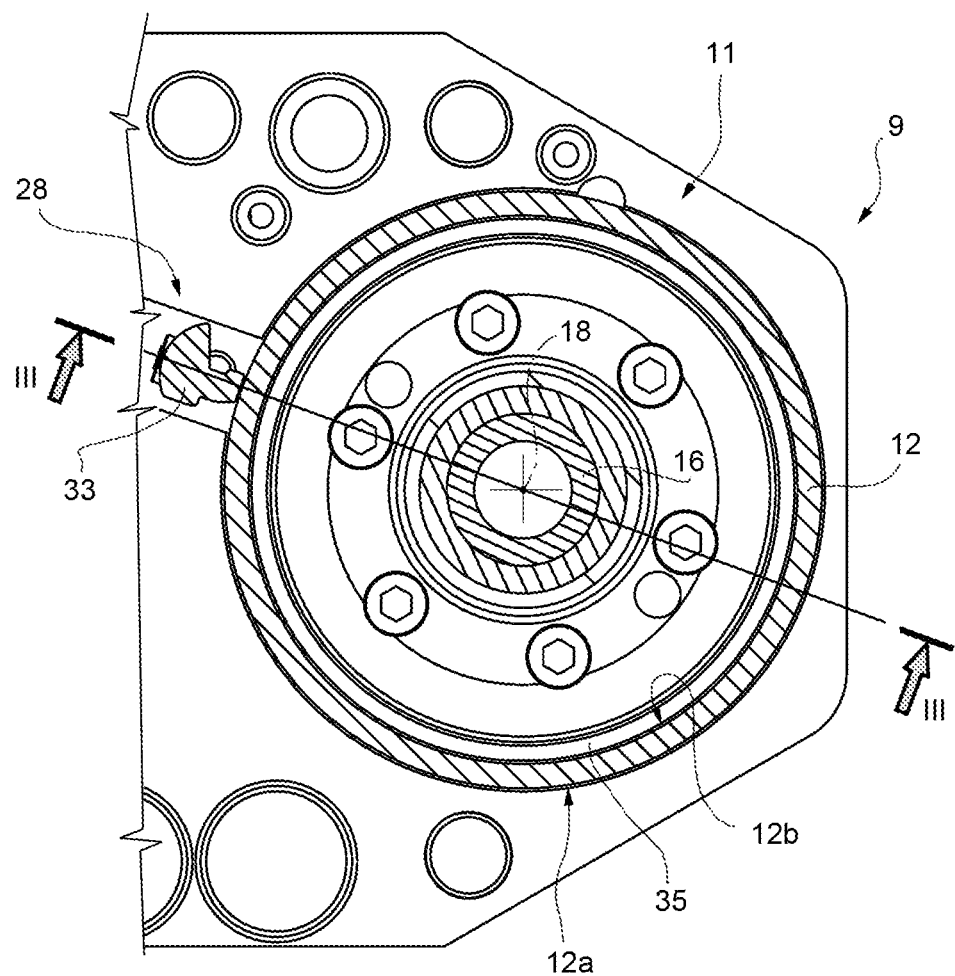
FIG. 2 shows a top plan view, with parts removed for clarity, of a detail in FIG. 1.
Figure 3:
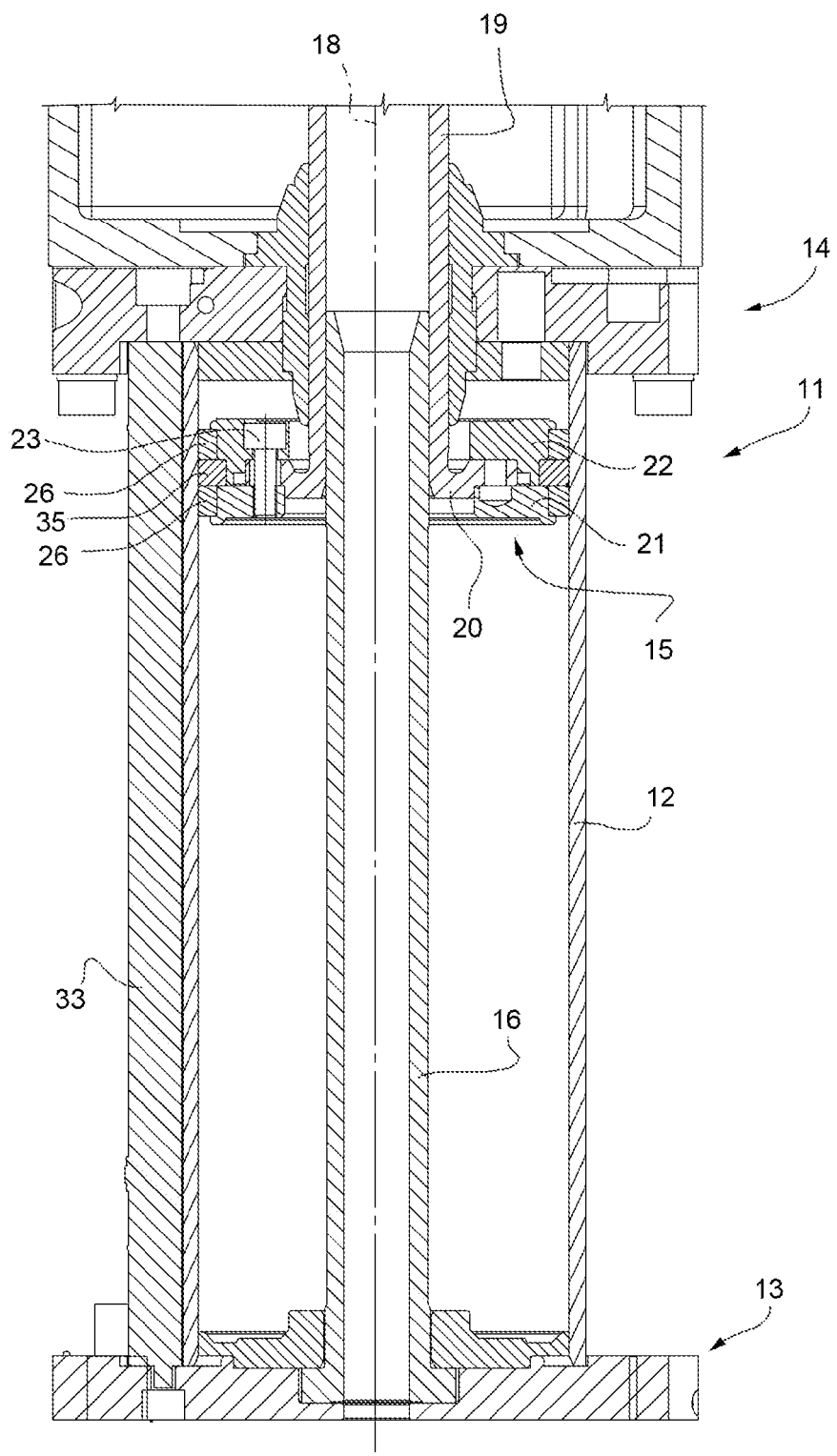
FIG. 3 shows a section along line in FIG. 2.
Figure 4:
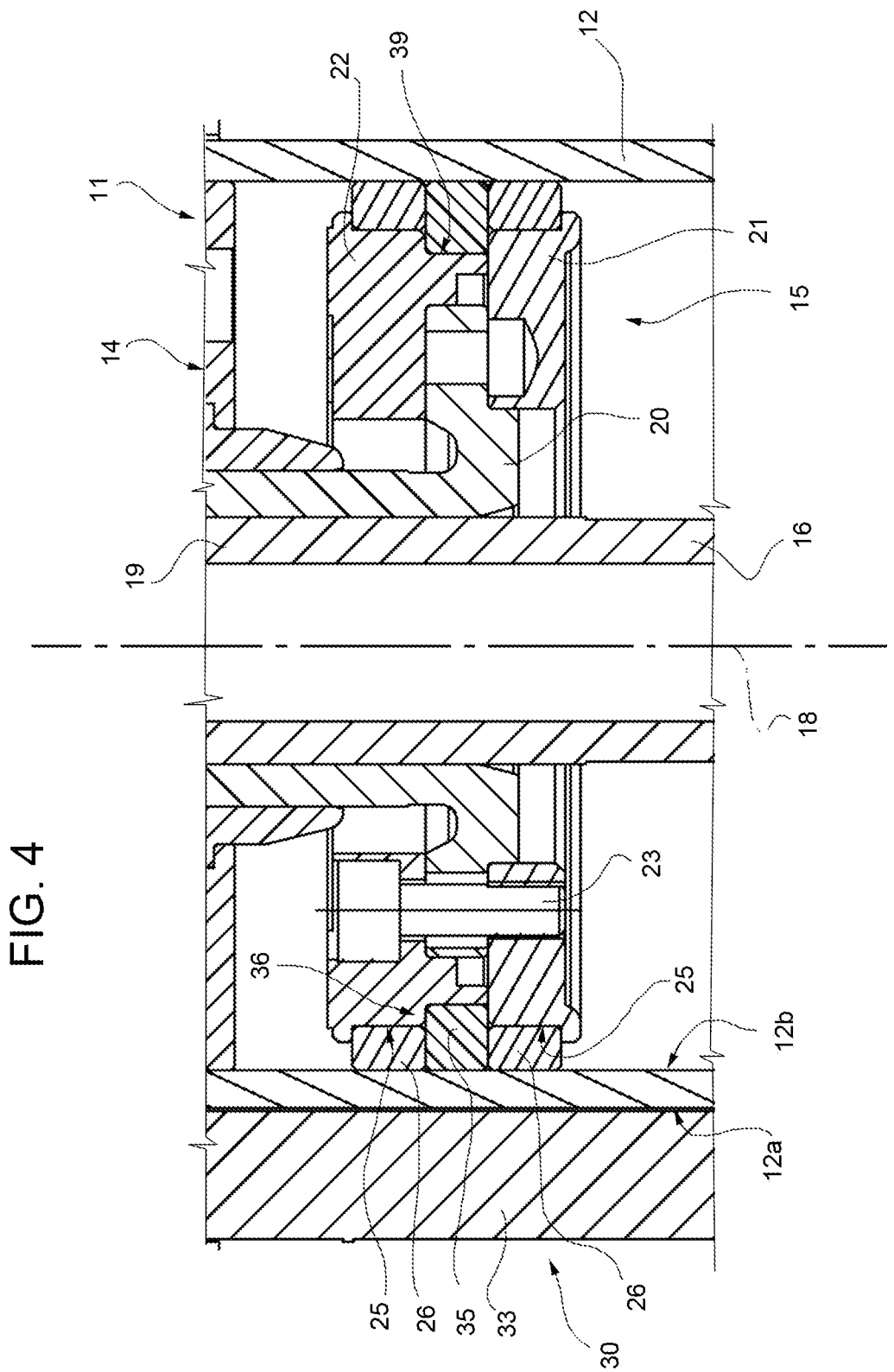
FIG. 4 shows a larger-scale section of a detail in FIG. 3.

With reference to FIGS. 2 to 4, each linear actuator 11 comprises a fixed cylindrical outer sleeve 12 made of paramagnetic material—conveniently an aluminium alloy—and closed by two heads 13 and 14; and an annular piston 15 fitted to sleeve 12 in fluidtight manner, and to a guide rod 16 coaxial with the axis 18 of sleeve 12 and connected integrally to head 13.

Each actuator 11 also comprises a tubular rod 19, which is connected integrally to piston 15, is connected telescopically to guide rod 16, and is fitted integrally in known manner with respective punch 10, which penetrates respective mold 7 and, in use, respective glass gob 6 to press the molten glass against the lateral walls of mold 7.

Each piston 15 slides inside respective sleeve 12 between a forward position (FIG. 3) exerting pressure on the glass inside respective mold 7, and in which piston 15 is located adjacent to head 14 and punch 10 is inserted inside mold 7; and a withdrawn position, in which piston 15 contacts head 13.

In the example described, each piston 15 comprises an annular connecting flange 20 formed in one piece with rod 19; and two annular fastening flanges 21, 22, which are separate from and located on opposite axial sides of annular connecting flange 20, and are tightened to one another and onto flange 20 by screws 23. Each fastening flange 21, 22 defines a retaining seat 25 for a respective seal 26 (FIG. 4).

As shown in FIG. 1, machine 1 also comprises an assembly 28 for controlling and altering the weight or mass of glass gobs 6.

For each extruder rod 3a, assembly 28 comprises respective linear actuator 11; respective punch 10; and a respective position transducer 30 for determining the position of relative piston 15, and therefore of relative punch 10, along axis 18.

Assembly 28 comprises a control unit 32, which receives a position signal from each position transducer 30, and transmits correction signals in known manner to extruder 3, and more specifically to both rotating tube 3b and an assembly for controlling the position of rods 3a.

As shown in FIGS. 2, 3 and 4, each position transducer 30 comprises a rod-like fixed member 33, which is located outside relative sleeve 12 (FIG. 2), is positioned substantially contacting the outer lateral surface 12a of sleeve 12, extends between heads 13 and 14 to a length substantially equal to the travel of piston 15, so as to permit detection of any axial position of punch 10, and is connected electrically to unit 32.

Each transducer 30 also comprises a movable member 35, which is made of magnetic material, e.g. of the type comprising rare earth, and is located next to fixed member 33 and between seals 26 which provide for protecting it. In the example described, magnetic movable member 35 is defined by an annular disk, which surrounds relative piston 15, coaxially with axis 18, projects beyond an outer lateral surface of piston 15 between seals 26, and is positioned adjacent to the inner surface 12b of sleeve 12.

Each movable member 35 is insulated electrically from relative piston 15, and is fitted to piston 15 by a clamping device 36 comprising a circumferential seat 39 for partly housing movable member 35 and defined by flanges 21 and 22, which are screwed together by screws 23 to grip movable member 35.

Figure 5:
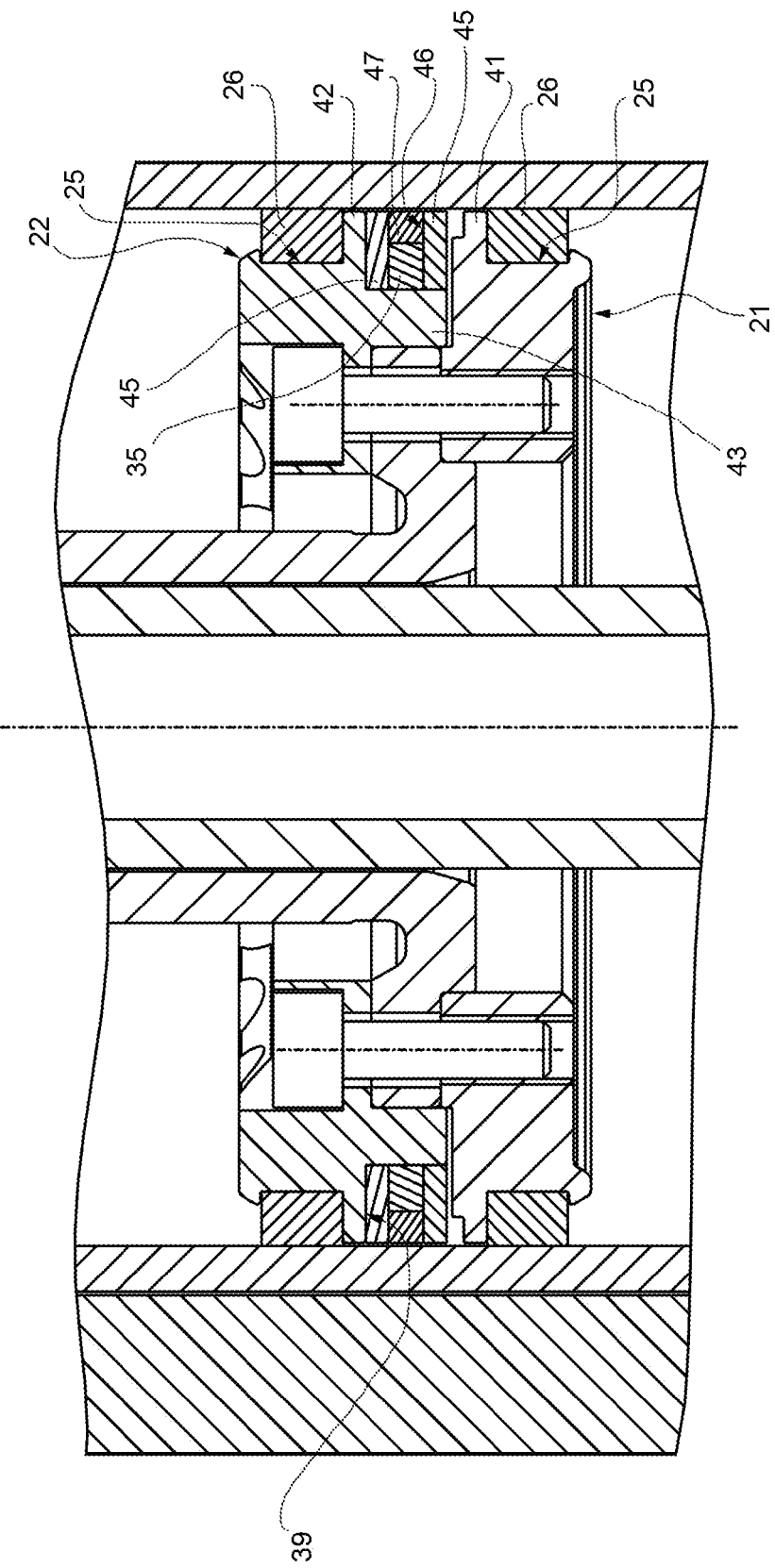
FIG. 5 shows the same view as in FIG. 4, of a variation of a detail in FIG. 4.

In the FIG. 5 variation, annular flanges 21 and 22 comprise respective annular appendixes 41 and 42 projecting towards sleeve 12 and loosely engaging surface 12b of sleeve 12.

With the rest of respective annular flange 21, 22, each annular appendix 41, 42 defines a seat 25 for housing relative seal 26, which rests axially on respective annular appendix 41, 42.

Together with sleeve 12 and a central cylindrical portion 43 of annular flange 22, appendixes 41 and 42 define annular seat 39, which completely or at least partly houses two magnet washers 45 conveniently made of ferromagnetic material and each positioned against relative annular appendix 41, 42.

Magnetic movable member 35 is positioned between washers 45 and contacting cylindrical portion 43. Unlike the FIG. 4 embodiment, movable member 35 has an outside radial dimension much smaller than the inside corresponding radial dimension of sleeve 12, and is therefore housed entirely inside seat 39.

Together with washers 45, magnetic movable member 35 in turn defines a further seat 46. Seat 46 is engaged by a ring or collar 47 made of paramagnetic material, distinct from the magnetic movable member 35, and conveniently made of metal. Ring 47 is fitted to or at least fixed firmly to magnetic movable member 35, extends contacting washers 45, and is connected in sliding manner to sleeve 12. In an alternative variation, ring 47 projects beyond washers 45, towards sleeve 12.

Regardless of the geometry and radial dimensions of magnetic movable member 35, of the presence or not of ring 47, or of how magnetic movable member 35 is connected to piston 15, the fact that movable magnetic member 35 is detachable from piston 15 allows it to be connected to piston 15 when needed, and allows actuator 11 to be used as an ordinary actuator when the axial position of piston 15 need not be detected. In other words, depending on requirements, movable member 35 may be inserted or not, with or without ring 47, with no geometrical or structural alterations to linear actuator 11.

Similarly, neither is fixed member 33 assembled outside the actuator sleeve 12, when position detection is not required.

Unlike the FIG. 4 solution, the FIG. 5 embodiment obviously enables the use of smaller magnetic movable members 35 that are cheaper and easier to produce. That is, movable member 35 in the FIG. 5 embodiment has less stringent geometric and/or dimensional tolerances, by not cooperating with the inner surface 12b of sleeve 12, and by being surrounded by metal ring 47, which is intrinsically easier to machine. Predetermined clearances between ring 47 and sleeve 12, and predetermined distances between magnetic movable member 35 and sleeve 12 may thus be achieved, and the efficiency and reliability of the transducer enhanced. In actual use, the amount of glass inside the mold, and therefore the mold volume occupied by the glass, is determined by the transducer detecting the position of the relative piston, and therefore of the relative punch, when pressing the glass inside the mold. On the basis of the position reading, control unit 32 generates a signal to correct the position of rotating tube 3b and/or rods 3a, and so achieve an optimum target volume or mass of each glass gob 6.

Producing transducer 30—and, more specifically, locating the stator portion of the transducer outside sleeve 12, and connecting the moving part to piston 15—demands no particular actuator design features, and no major alterations to either the actuator or adjacent parts.

Being simply connected to the actuator and extending partly outside the actuator sleeve, the transducer simplifies maintenance and can be replaced easily in the event of failure. For the same reason, the transducer is unaffected by chaffing or stress caused by movement of the piston and rod with respect to the sleeve.

Moreover, the transducer is also unaffected by lubricating components in the actuator operating fluid, and by dirt and contaminants inevitably contained in the operating fluid.

Finally, the design of assembly 28 enables a glass gob weight control assembly to be achieved, that is cheap and easy to produce and at the same time highly efficient and reliable.

The invention claimed is:

1. A glass gob weight control assembly for a glassware molding machine, the assembly comprising:
   a punch for at least partly penetrating a glass gob;
   a fluidic linear actuator for moving said punch, said fluidic linear actuator comprising an outer sleeve and a piston that slides inside said outer sleeve, said piston being connected integrally to said punch and being movable between two limit positions, said two limit positions being a withdrawn position and a forward position in which said punch is inserted inside said glass gob; and
   a transducer for determining a position of said piston between said withdrawn and forward positions, said outer sleeve being made of paramagnetic material, said transducer comprising a magnetic movable member fitted to said piston and a fixed member located outside said outer sleeve and cooperating with said magnetic movable member, said fixed member contacting said outer sleeve.

2. An assembly as claimed in claim 1, wherein said fixed member is located adjacent to an outer surface of said sleeve, and is parallel to a travel direction of said piston.

3. An assembly as claimed in claim 1, wherein said magnetic movable member is defined by an annular body projecting outwards of an outer lateral surface of said piston.

4. An assembly as claimed in claim 1, wherein said magnetic movable member is housed completely inside said piston.

5. A glass gob weight control assembly for a glassware molding machine, the assembly comprising:
- a punch for at least partly penetrating a glass gob,
- a fluidic linear actuator for moving said punch said fluidic linear actuator comprising a outer sleeve and a piston that slides inside said outer sleeve, said piston being connected integrally to said punch and being movable between two limit positions, said two limit positions being a withdrawn position and a forward position in which said punch is inserted inside said glass gob; and
- a transducer for determining a position of said piston between said withdrawn and forward positions, said outer sleeve being made of paramagnetic material, said transducer comprising a magnetic movable member fitted to said piston and a fixed member located outside said outer sleeve and cooperating with said magnetic movable member, wherein said magnetic movable member is housed completely inside said piston, and wherein said magnetic movable member is surrounded by a spacer ring made of different material from the magnetic movable member and interposed between the magnetic movable member and an inner surface of said outer sleeve.

6. An assembly as claimed in claim 5, further comprising two annular washers located on opposite axial sides of said magnetic movable member and said spacer ring.

7. An assembly as claimed in claim 6, wherein said piston comprises two outer radial flanges projecting towards said inner surface, and wherein each of said washers rests on a respective one of said two outer radial flanges.

8. An assembly as claimed in claim 7, wherein said two outer radial flanges define a seat completely housing said magnetic movable member and said two annular washers.

9. An assembly as claimed in claim 1, wherein said piston has a circumferential groove at least partly housing said magnetic movable member for connecting said magnetic movable member to said piston.

10. A glass gob weight control assembly for a glassware molding machine, the assembly comprising:
- a punch for at least partly penetrating a glass gob;
- a fluidic linear actuator for moving said punch, said fluidic linear actuator comprising an outer sleeve and a piston that slides inside said outer sleeve, said piston being connected integrally to said punch and being movable between two limit positions, said two limit positions being a withdrawn position and a forward position in which said punch is inserted inside said glass gob;
- a transducer fear determining a position of said piston between said withdrawn and forward positions, said outer sleeve being made of paramagnetic material, said transducer comprising a magnetic movable member fitted to said piston and a fixed member located outside said outer sleeve and cooperating with said magnetic movable member, wherein said piston has a circumferential groove at least partly housing said magnetic movable member for connecting said magnetic movable member to said piston, wherein said piston comprises an annular connecting flange integral with said punch and two annular fastening flanges separate from said annular connecting flange, and wherein said two annular fastening flanges are fastened onto the connecting flange by a screw connection.

11. An assembly as claimed in claim 10, wherein each of said two annular fastening flanges supports a respective seal, and wherein said magnetic movable member is located between each said respective seal.

12. A glass gob weight control assembly for a glassware molding machine, the assembly comprising:
- a punch for at least partly penetrating a glass gob;
- a fluidic linear actuator for moving said punch, said fluidic linear actuator comprising an outer sleeve and a piston that slides inside said outer sleeve, said piston being connected integrally to said punch and being movable between two limit positions, said two limit positions being a withdrawn position and a forward position in which said punch is inserted inside said glass gob;
- a transducer for determining a position of said piston between said withdrawn and forward positions, said outer sleeve being made of paramagnetic material, said transducer comprising a magnetic movable member fitted to said piston and a fixed member located outside said outer sleeve and cooperating with said magnetic movable member; and
- a control unit to correct a position of an extruder rod for producing a continuous rope of molten glass and/or a rotating hollow tube to open or close an extruded-glass passage to regulate outflow of extruded glass.

\* \* \* \* \*